US011172165B2

(12) United States Patent
Goffin et al.

(10) Patent No.: US 11,172,165 B2
(45) Date of Patent: *Nov. 9, 2021

(54) METHOD AND SYSTEM FOR MONITORING A LOCATION

(71) Applicant: Google Technology Holdings LLC, Mountain View, CA (US)

(72) Inventors: Glen P. Goffin, Dublin, PA (US); Evan A. Groat, Lansdale, PA (US); David Grubb, Doylestown, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,566

(22) Filed: Aug. 19, 2019

(65) Prior Publication Data

US 2020/0029051 A1  Jan. 23, 2020

Related U.S. Application Data

(63) Continuation of application No. 15/445,845, filed on Feb. 28, 2017, now Pat. No. 10,389,979, which is a continuation of application No. 14/468,030, filed on Aug. 25, 2014, now Pat. No. 9,602,782, which is a continuation of application No. 11/616,352, filed on Dec. 27, 2006, now Pat. No. 8,817,951.

(51) Int. Cl.
*H04N 7/18* (2006.01)
*H04L 29/08* (2006.01)
*G08C 17/02* (2006.01)

(52) U.S. Cl.
CPC .............. *H04N 7/18* (2013.01); *G08C 17/02* (2013.01); *H04L 67/025* (2013.01)

(58) Field of Classification Search
CPC ......... G08C 17/02; H04L 67/025; H04N 7/18
USPC ..................... 348/14.01–14.16, 143
See application file for complete search history.

(56) References Cited

U.S. PATENT DOCUMENTS 5,585,839 A   12/1996  Ishida et al.
5,712,906 A    1/1998  Grady et al.
(Continued)

FOREIGN PATENT DOCUMENTS

WO   WO 2008/082789 A3   7/2008

OTHER PUBLICATIONS

Patent Cooperation Treaty, "PCT Search Report and Written Opinion of the International Searching Authority" International Application No. PCT/US07/83848 (BCS04043) dated Mar. 12, 2008, 8 pgs.

(Continued)

*Primary Examiner* — Hemant S Patel
(74) *Attorney, Agent, or Firm* — Shumaker & Sieffert, P.A.

(57) ABSTRACT

A method and system for monitoring a location via a called telephony communication device is disclosed. The method at the called telephony communication device includes receiving a request from a calling telephony communication device. Further, the method includes determining whether the received request is for monitoring the location. The method further includes automatically transmitting audio/video data captured via the called telephony communication device to the calling telephony communication device when the received request is determined to be one for monitoring the location.

16 Claims, 4 Drawing Sheets

(56) References Cited

U.S. PATENT DOCUMENTS

| | | | |
|---|---|---|---|
| 6,061,434 | A | 5/2000 | Corbett |
| 6,424,660 | B2 * | 7/2002 | Jacobson, Jr. ......... G08C 17/00 |
| | | | 340/12.22 |
| 6,567,502 | B2 | 5/2003 | Zellner et al. |
| 6,597,389 | B2 | 7/2003 | Tanaka et al. |
| 6,697,103 | B1 | 2/2004 | Fernandez et al. |
| 6,698,021 | B1 | 2/2004 | Amini et al. |
| 6,744,865 | B2 * | 6/2004 | Lahutsky ......... G08B 13/19645 |
| | | | 379/102.01 |
| 6,799,031 | B1 | 9/2004 | Lewiner et al. |
| 7,096,002 | B2 | 8/2006 | Hargett |
| 7,190,945 | B1 | 3/2007 | Crisafulli |
| 7,302,481 | B1 | 11/2007 | Wilson |
| 7,317,911 | B2 | 1/2008 | Brenig et al. |
| 7,468,676 | B2 | 12/2008 | Styers et al. |
| 7,532,709 | B2 | 5/2009 | Styers et al. |
| 7,793,327 | B2 | 9/2010 | Miethe et al. |
| 7,885,272 | B2 * | 2/2011 | Burger .................... H04L 12/14 |
| | | | 370/401 |
| 8,817,951 | B2 | 8/2014 | Goffin et al. |
| 9,602,782 | B2 * | 3/2017 | Goffin .................. H04L 67/025 |
| 2002/0113861 | A1 * | 8/2002 | Lim ....................... H04N 7/148 |
| | | | 348/14.02 |
| 2004/0036596 | A1 | 2/2004 | Heffner et al. |
| 2004/0054789 | A1 | 3/2004 | Breh et al. |
| 2004/0135879 | A1 | 7/2004 | Stacy et al. |
| 2004/0185900 | A1 | 9/2004 | McElveen |
| 2004/0203712 | A1 | 10/2004 | Murai et al. |
| 2004/0204040 | A1 | 10/2004 | Heijnen |
| 2005/0074105 | A1 | 4/2005 | Corbett et al. |
| 2005/0111629 | A1 * | 5/2005 | Carlson ............... H04M 3/2281 |
| | | | 379/35 |
| 2005/0221841 | A1 | 10/2005 | Piccionelli et al. |
| 2005/0255826 | A1 | 11/2005 | Wittenburg et al. |
| 2006/0009238 | A1 | 1/2006 | Stanco et al. |
| 2006/0026649 | A1 * | 2/2006 | Shieh ................ H04M 1/72547 |
| | | | 725/62 |
| 2006/0155851 | A1 | 7/2006 | Ma et al. |
| 2006/0176167 | A1 | 8/2006 | Dohrmann |
| 2006/0206011 | A1 | 9/2006 | Higgins et al. |
| 2007/0063840 | A1 | 3/2007 | Jentoft |
| 2007/0071209 | A1 | 3/2007 | Horvitz et al. |
| 2007/0185989 | A1 | 8/2007 | Corbett et al. |
| 2007/0286181 | A1 | 12/2007 | Bushmitch et al. |
| 2007/0290830 | A1 | 12/2007 | Gurley |
| 2008/0016366 | A1 * | 1/2008 | Monroe .............. H04L 12/2805 |
| | | | 713/182 |
| 2008/0081602 | A1 | 4/2008 | Chen |
| 2008/0129498 | A1 | 6/2008 | Howarter et al. |
| 2008/0129821 | A1 * | 6/2008 | Howarter ............. G08B 13/196 |
| | | | 348/143 |
| 2008/0155607 | A1 | 6/2008 | Klappert |
| 2008/0267614 | A1 | 10/2008 | Boss et al. |
| 2010/0149335 | A1 | 6/2010 | Miller, II |
| 2010/0171600 | A1 | 7/2010 | Wu |
| 2010/0316212 | A1 | 12/2010 | Fano et al. |
| 2010/0317317 | A1 | 12/2010 | Maier et al. |
| 2011/0113453 | A1 | 5/2011 | Ralston et al. |

OTHER PUBLICATIONS

General Instrument Corp., ISR/WO International App. No. PCT/US07/83848, dated Mar. 12, 2008, 4 pgs.
International Preliminary Report Patentability, General Inst. Corp., PCT/US2007/083848, dated Jun. 30, 2009, 5 pgs.
Prosecution History from U.S. Appl. No. 11/616,352, dated Aug. 4, 2010 through Apr. 18, 2014, 106 pp.
Prosecution History from U.S. Appl. No. 14/468,030, dated Mar. 20, 2016 through Nov. 7, 2016, 80 pp.
Prosecution History from U.S. Appl. No. 15/445,845, dated Oct. 9, 2018 through Apr. 9, 2019, 46 pp.

* cited by examiner

METHOD AND SYSTEM FOR MONITORING A LOCATION

CROSS-REFERENCE TO RELATED APPLICATIONS

This application is a continuation of U.S. patent application Ser. No. 15/445,845, entitled "Method and System for Monitoring a Location," filed Feb. 28, 2017, now U.S. Pat. No. 10,389,979, issued Aug. 20, 2019, which is a continuation of U.S. patent application Ser. No. 14/468,030, entitled "Method and System for Monitoring a Location," filed Aug. 25, 2014, now U.S. Pat. No. 9,602,782, issued Mar. 21, 2017, which is a continuation of U.S. patent application Ser. No. 11/616,352, entitled "Method and System for Monitoring a Location," filed Dec. 27, 2006, now U.S. Pat. No. 8,817,951, issued Aug. 26, 2014, all of which is are herein incorporated by reference in their entirety.

FIELD OF THE INVENTION

This invention generally relates to surveillance, and more specifically, to a method and system for monitoring a location.

BACKGROUND OF THE INVENTION

Communication networks are becoming increasingly popular with an increase in the need for communication and information exchange. A communication network can include a plurality of communication devices. Some examples of the communication networks include a computer network, the Internet-Protocol based network, a public-switched telephone network, a code division multiple access (CDMA) network, and a global system for mobile communication (GSM) network. Some examples of the communication devices include personal computers, mobile phones, laptop computers, video phones, landline phones and Personal Digital Assistants (PDAs). A communication device in the communication network can receive a request from another communication device to provide information related to the request. For example, a personal computer can receive a request from a mobile phone to provide audio/video content related to the request, via the Internet. The audio/video content of a location may be required when a location needs to be monitored. For example, many people want to monitor their houses when they are away on a vacation or at their workplace.

In one of the known techniques for monitoring a location, use of a dedicated monitoring system is required. In this technique, a closed-circuit television (CCTV) is used for monitoring. Therefore, the dedicated monitoring system can be expensive or incur extra cost. In light of the above mentioned discussion, there is a need for a system that is cost-effective and does not involve use of a dedicated monitoring system.

BRIEF DESCRIPTION OF THE FIGURES

The accompanying figures, where like reference numerals refer to identical or functionally similar elements throughout the separate views, and which together with the detailed description below, are incorporated in and form part of the specification, serve to further illustrate various embodiments and explain various principles and advantages, all in accordance with the present invention.

Figure 1:
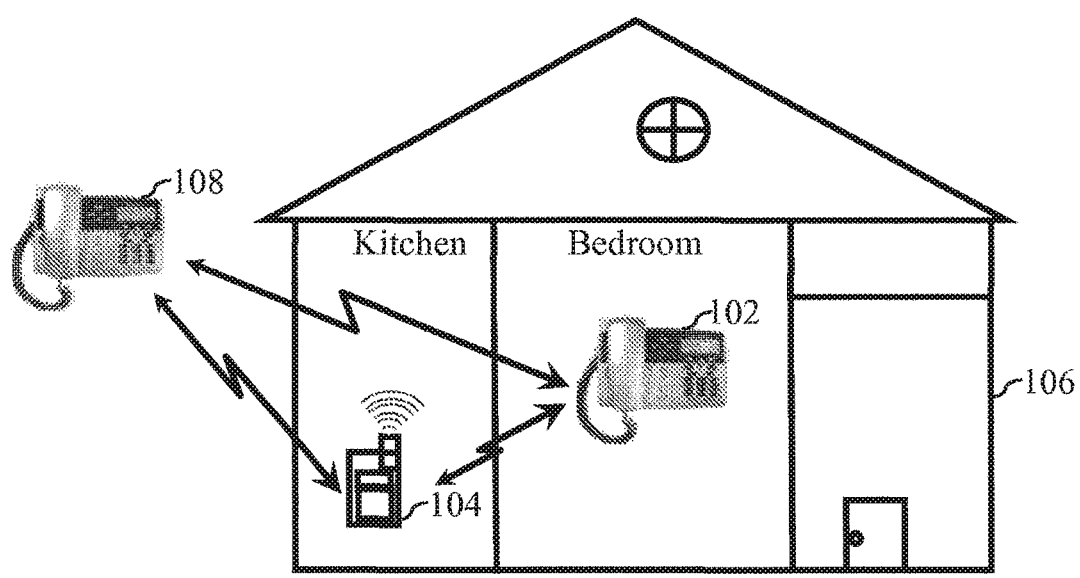
FIG. 1 illustrates an exemplary communication network, in accordance with various embodiments of the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of various embodiments of the present invention.

DETAILED DESCRIPTION

For one embodiment, a method for monitoring a location Via a called telephony communication device is provided. The method at the called telephony communication device includes receiving a request from a calling telephony communication device. The method also includes determining whether the received request is for monitoring the location. Further, the method includes automatically transmitting audio/video data captured via the called telephony communication device to the calling telephony communication device when the received request is determined to be one for monitoring the location.

For another embodiment, a telephony communication device is provided. The telephony communication device includes a receiver that is adapted to receive a request from a calling telephony communication device. The telephony communication device also includes a processor that is adapted to determine whether the request is for monitoring a location. Further, the telephony communication device includes a camera that is adapted to capture video data of the location based upon the determination that the received request is for monitoring the location. Moreover, the telephony communication device includes a transmitter that is adapted to automatically transmit the captured video data to the calling telephony communication device in response to the determination that the received request is for monitoring the location.

For yet another embodiment, a telephony communication device is provided. The telephony communication device includes a receiver that is adapted to receive a request from a calling telephony communication device. The telephony communication device also includes a processor that is adapted to determine whether the request is for monitoring a location. Further, the telephony communication device includes at least one a microphone and one or more telemetry sensor devices. The microphone is adapted to capture audio data of the location based upon the determination that the received request is for monitoring the location. Moreover, the telephony communication device includes a transmitter that is adapted to automatically transmit the captured audio data to the calling telephony communication device in response to the determination that the received request is for monitoring the location. Further, the transmitter is adapted to automatically transmit a data captured by the one or more telemetry sensor devices.

Before describing in detail the particular method and system for monitoring a location, in accordance with various embodiments of the present invention, it should be observed that the present invention resides primarily in combinations of method steps and system components related to monitoring a location. Accordingly, the system components have been represented where appropriate by conventional symbols in the drawings, showing only those specific details that are pertinent for an understanding of the present invention, so as not to obscure the disclosure with details that will be readily apparent to those with ordinary skill in the art, having the benefit of the description herein.

In this document, relational terms such as first and second, and the like, may be used solely to distinguish one entity or action from another entity or action without necessarily requiring or implying any actual relationship or order between such entities or actions. The terms 'comprises,' 'comprising,' 'includes,' or any other variation, are intended to cover a non-exclusive inclusion, such that a process, method, article, or apparatus that comprises a list of elements does not include only those elements but may include other elements that are not expressly listed or inherent to such a process, method, article, or apparatus. An element proceeded by 'comprises . . . a', does not, without more constraints, preclude the existence of additional identical elements in the process, method, article, or apparatus that comprises the element. The term 'another,' as used in this document, is defined as at least a second or more. The terms 'includes' and/or 'having', as used herein, are defined as comprising.

FIG. 1 illustrates an exemplary communication network 100, in accordance with various embodiments of the present invention. The communication network 100 can include a plurality of communication devices. Examples of the communication network 100 can include, but are not limited to, an IEEE 802.16-based broadband wireless access network, an advanced mobile phone systems (AMPS) network, a global system for mobile communications (GSM) network, a digital cellular systems (DCS) network, a universal mobile telecommunication system (UMTS) network, a code division multiple access (CDMA) network, a Public-switched telephone network using H.324, the Internet-Protocol (IP) based network, and any other wired or wireless network that can support telephony. For the purpose of this description, the communication network 100 is shown to include a telephony communication device 102, and a communication device 104 at a location 106. The communication network 100 is also shown to include a telephony communication device 108. The telephony communication device 108 can be located at a distance from the location 106. For example, the telephony communication device 108 can be located at a workplace of a user and/or at a public place. Examples of the telephony communication device 102 and the telephony communication device 108 can include, but are not limited to, a video phone, a Personal Digital Assistant (PDA), and a mobile phone. Examples of the communication device 104 can include, but are not limited to, a mobile phone, a laptop computer, a Personal Digital Assistant (PDA), an Internet Protocol (IP)-enabled phone, a video-broadcast system, and a video phone.

For one embodiment, the telephony communication device 102 can receive a request from the telephony communication device 108 to monitor. For example, when a user is away to his/her workplace, the user can request the telephony communication device 102 via the telephony communication device 108, to monitor his/her bedroom at the location 106. Similarly, the communication device 104 can make a request to the telephony communication device 102 to monitor the bedroom. For example, when the user is busy in the kitchen and wants to monitor his/her baby in the bedroom, the user can request the telephony communication device 102 via the communication device 104. For one embodiment, the communication device 104 can request the telephony communication device 102 via a short-range communication link. Examples of the short-range communication link include, but are not limited to, an infrared communication link, a Universal Serial Bus (USB) communication link or other direct-wired link, a Bluetooth™, and a Wireless Fidelity (Wi-Fi) communication link.

Figure 2:
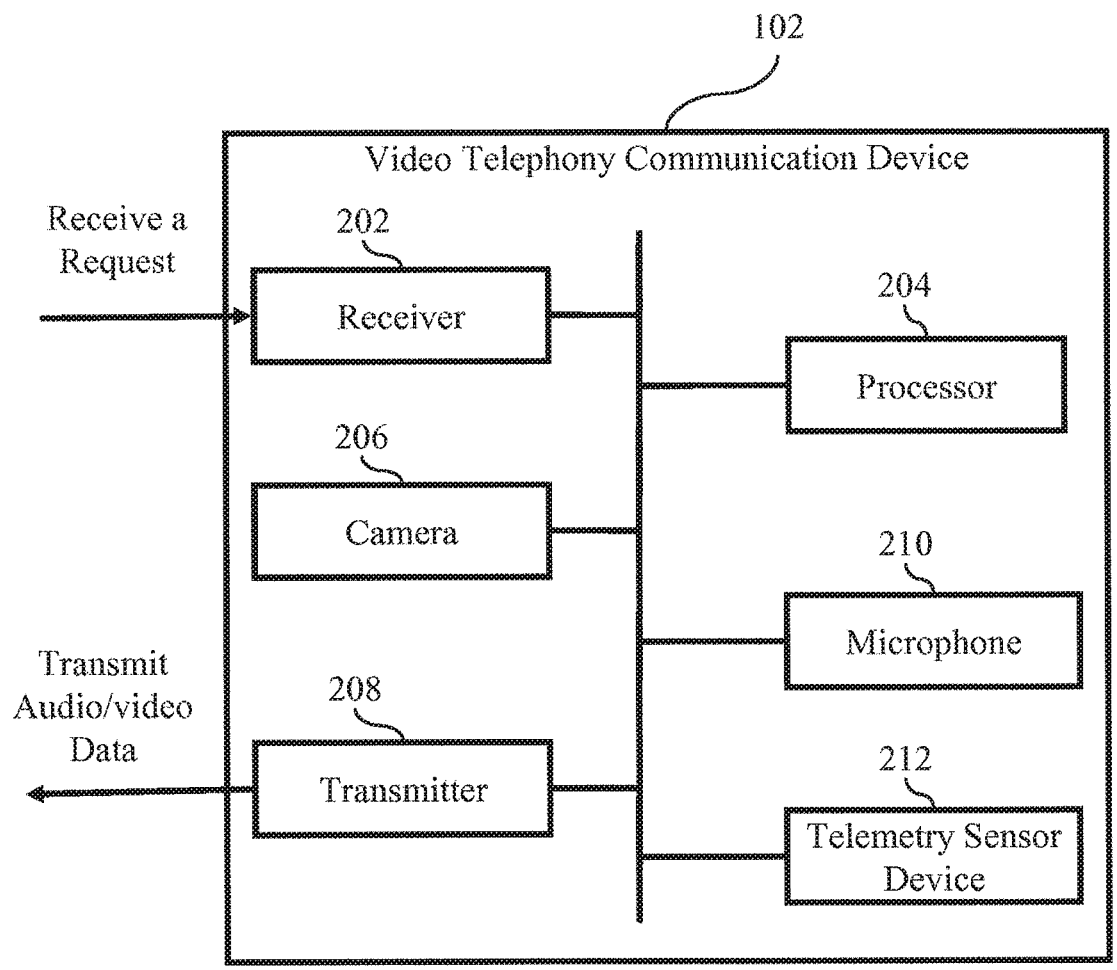
FIG. 2 illustrates a telephony communication device, in accordance with one embodiment of the present invention.

FIG. 2 is the telephony communication device 102 for monitoring a location, in accordance with one embodiment of the present invention. The telephony communication device 102 includes a receiver 202, a processor 204, a camera 206, a transmitter 208, and a microphone 210. Examples of the telephony communication device 102 can include, but are not limited to, a Personal Digital Assistant (PDA) and a mobile phone. The receiver 202 is adapted to receive a request from a calling telephony communication device, for example, the telephony communication device 108. For one embodiment, the receiver 202 can receive the request from the calling telephony communication device via an internet-protocol. For one embodiment, the telephony communication device 102 provides no audible alert signal in response to the request received from the calling telephony communication device. The receiver 202 provides the received request to the processor 204.

The processor 204 is adapted to determine whether the request received from the calling telephony communication device is for monitoring the location. When the processor 204 determines that the request received is for monitoring the location, video data of the location can be captured by the camera 206. Examples of the camera 206 include, but are not limited to, a complementary metal-oxide-semiconductor (CMOS) image sensor and a charge-coupled device (CCD) type camera. The video data captured by the camera 206 can be automatically transmitted to the calling telephony communication device by the transmitter 208 in response to the processor 204 determining that the request received is for monitoring the location.

For one embodiment, the processor 204 is adapted to authenticate the calling telephony communication device. The processor 204 can authenticate the calling telephony communication device based on a location of the calling telephony communication device, its identity, a password entered at the calling telephony communication device, and/or a biometric parameter sampled at the calling telephony communication device. Examples of the biometric parameter sample can include, but are not limited to, a fingerprint pattern, an eye retina pattern, a facial pattern, and hand measurement of a user of the calling telephony communication device.

Audio data of the location 106 can be captured by the microphone 210, when the processor 204 determines that the received request is for monitoring the location. Further, the captured audio data can be transmitted to the calling telephony communication device by the transmitter 208. Examples of the microphone 210 can include, but are not limited to, a carbon microphone, a ribbon microphone and a piezo microphone.

For one embodiment, the telephony communication device 102 can include one or more telemetry sensor devices, for example, a telemetry sensor device 212. The one or more telemetry sensor devices can capture data related to the location, for example, a temperature, humidity, and a pressure of the location. For example, the telemetry sensor device 212 can capture temperature of the location 106. Further, the one or more telemetry sensor devices can also capture the infra-red movement at the location.

Figure 3:
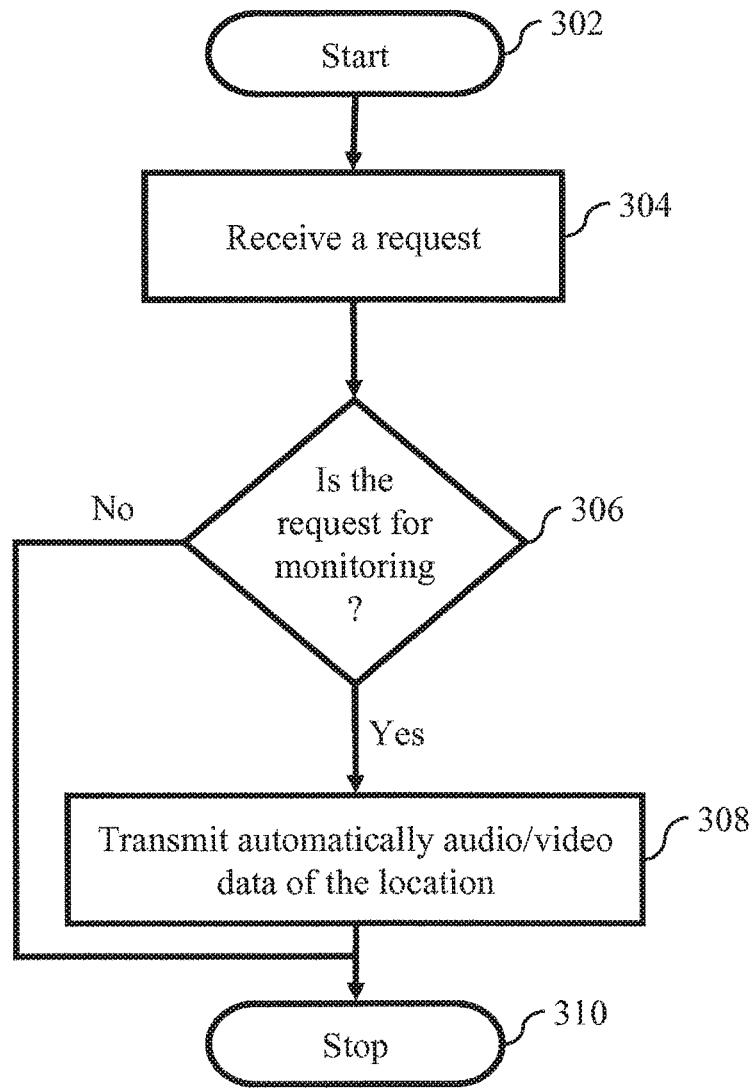
FIG. 3 is a flow diagram illustrating a method for monitoring a location via a called telephony communication device, in accordance with one embodiment of the present invention.

FIG. 3 is a flow diagram illustrating a method for monitoring a location via a called telephony communication device, in accordance with one embodiment of the present invention. The method for monitoring the location via the called telephony communication device is initiated at step 302. For example, a bedroom at the location 106 can be monitored via the telephony communication device 102. The called telephony communication device receives a request from a calling telephony communication device at step 304. For example, the telephony communication device 102 can receive a request from either or both the communication device 104 and the telephony communication device 108, to monitor the bedroom. At step 306, the called telephony communication device can determine whether the received request is for monitoring the location. If it is determined at step 306, that the received request is for monitoring the location, the called telephony communication device automatically transmits the audio/video data to the calling telephony communication device at step 308. For one embodiment, a simplex transmission of the audio/video data can occur from the called telephony communication device to the calling telephony communication device. In this embodiment, once the calling telephony communication device starts monitoring the location, no data, for example, audio data is transmitted from the calling telephony communication device to the called telephony communication device. As a result, a user of the calling communication telephony communication device can monitor the location without disturbing, for example, a baby sleeping at the location. Thereafter, the method is terminated at step 310.

If it is determined at step 306, that the received request does not pertain to monitoring the location, but is a routine/normal communication session, the method is terminated at step 310. Examples of the routine/normal communication session can include, but are not limited to, a voice call, a Voice over Internet Protocol (VoiP) call, a push-to-talk session, a data session, an Internet session, a file download, a web-browsing session, a net-meeting session, a voice conference, and a video conference.

Figure 4:
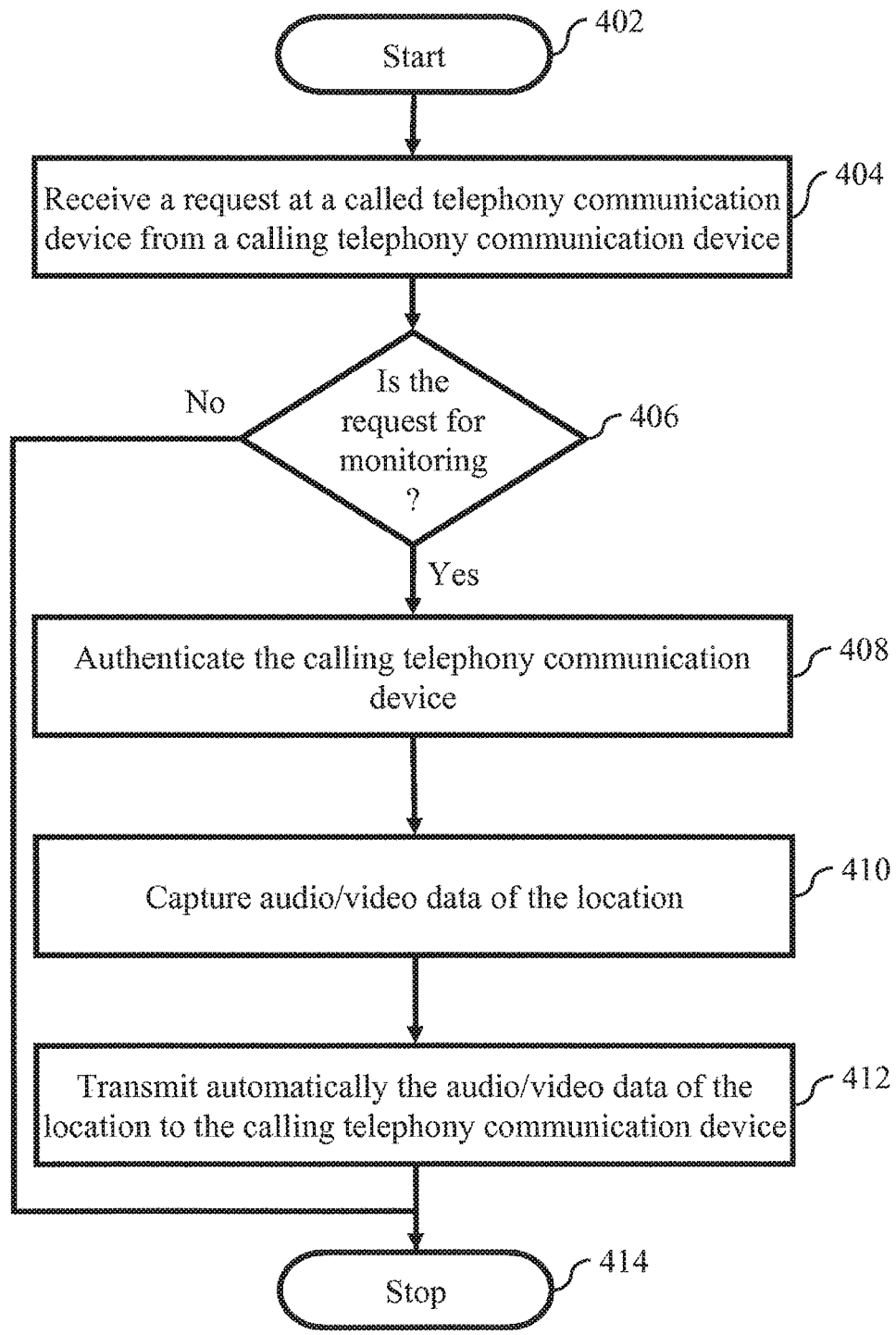
FIG. 4 is a flow diagram illustrating a method for monitoring a location via a called telephony communication device, in accordance with another embodiment of the present invention.

FIG. 4 is a flow diagram illustrating a method for monitoring a location, via a called telephony communication device, in accordance with another embodiment of the present invention. Examples of the called telephony communication device and the calling telephony communication device can include, but are not limited to, a video phone, a Personal Digital Assistant (PDA), and a mobile phone. The method at the called telephony communication device is initiated at step 402. At step 404, the called telephony communication device can receive a request from the calling telephony communication device. For example, the telephony communication device 102 can receive a request from the telephony communication device 108. For one embodiment, the request can be received by the calling telephony communication device via an Internet protocol. The internet-protocol is a data-oriented protocol used to transmit data across a computer network and a telecommunication network. For one embodiment, the receiver 202 of the called telephony communication device can receive the request from the calling telephony communication device.

For one embodiment, the called telephony communication device does not provide an audible alert signal in response to the request received from the calling telephony communication device. At step 406, the called telephony communication device determines whether the request received from the calling telephony communication device is for monitoring a location. For one embodiment, the processor 204 can determine whether the request is for monitoring the location.

If it is determined at the step 406 that the received request is for monitoring the location, the called telephony communication device can authenticate the calling telephony communication device at step 408. The processor 204 of the called telephony communication device can authenticate the calling telephony communication device. For one embodiment, the calling telephony communication device can be authenticated based on its location. For example, when the telephony communication device 102 located in bedroom of the location 106 receives a request from the communication device 104 located in the kitchen, it is apparent that the request is made by an authenticated person, for example, an owner of the location 106. Thereby, the telephony communication device 102 can authenticate the communication device 104.

For another embodiment of the present invention, the calling telephony communication device can be authenticated by using an identity of the calling telephony communication device. Examples of the identity can include, but are not limited to, a telephone number of the calling telephony communication device and an authorization code of the calling telephony communication device. Further, the calling telephony communication device can be authenticated based on a password entered at the calling telephony communication device and a biometric parameter sampled at the calling telephony communication device. Examples of the biometric parameter can include, but are not limited to, a fingerprint pattern, an eye retina pattern, facial pattern, and hand measurement of a user of the calling telephony communication device. For example, a user of the communication device 104 can sample his/her fingerprint pattern at a fingerprint sensor of the communication device 104. The sampled fingerprint pattern can be transmitted to the called telephony communication device. The called telephony communication device can match the received fingerprint pattern with a list of fingerprint patterns stored at the called telephony communication device. If the fingerprint pattern received, match against a fingerprint pattern in the stored list of fingerprint patterns, the calling telephony communication device can be authenticated.

If the calling telephony communication device is authenticated at step 408, step 410 is performed. At the step 410, the called telephony communication device captures audio/video data of the location. For one embodiment, the audio data can be captured by using the microphone 210 and the video data by using the camera 206. Further, the called telephony communication device can capture data of the location using one or more telemetry sensor devices. Examples of the data can include, but are not limited to, a temperature, humidity, and a pressure of the location. The captured audio/video data and/or the data captured by the one or more telemetry sensor devices of the location are automatically transmitted to the calling telephony communication device at step 412. For example, the telephony communication device 102 can transmit audio/video data of the bedroom at the location 106 to the communication device 104 when the communication device 104 has been authenticated by the telephony communication device 102. For one embodiment, the called telephony communication device can compress the video data before automatically transmitting using a codec. Examples of the codec include, but are not limited to, H.261, H.263, H.264, MPEG-1, MPEG-2, and MPEG-4. Thereafter, the method is terminated at step 414.

If it is determined at the step 406, that the request received is does not pertain to monitoring the location, the method is terminated at step 414.

The flow diagram provided above can be understood by considering the situation of a mother who wants to monitor her baby in the bedroom of the location 106, when she is busy in the kitchen. The mother can call the telephony communication device 102 by using the communication device 104. The telephony communication device 102 can automatically answer the communication device 104 without an audio alert signal, since the audio alert signal may wake up the baby. The telephony communication device 102, after authenticating the communication device 104 can automatically transmit audio/video data relating to the baby from the bedroom. For one embodiment, the telephony communication device 102 can authenticate the communication device 104 based on its location, that is the kitchen of the location 106.

Various embodiments, as described above, provide a method and system for monitoring a location. The present invention is cost-effective since it enables the use of commonly used telephony communication devices as monitoring devices. The present invention provides a system that is user-friendly since the telephony communication device is installed at different locations in households and at workplaces. Various embodiments provide a secure way for monitoring a location, since only an authenticated user can monitor the location. Further, the telephony communication device can automatically answer a request for monitoring the location without providing an audible alert signal. One embodiment provides a simplex transmission of audio/video data from a called telephony communication device to the calling telephony communication device. As a result, user of the calling telephony communication device can monitor a baby sleeping at the location without disturbing the baby. Further, a user can monitor his home or office while traveling. The user can also monitor his pets and children when away from home. Furthermore, the user can monitor his vacation homes from his home during storms.

In the foregoing specification, the invention and its benefits and advantages have been described with reference to specific embodiments. However, one with ordinary skill in the art would appreciate that various modifications and changes can be made without departing from the scope of the present invention, as set forth in the following claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all of the claims. The invention is defined solely by the appended claims, including any amendments made during the pendency of this application and all equivalents of those claims as issued.

What is claimed is:

1. A method comprising:
   at a first communication device having one or more processors, a memory storing one or more programs and a camera, wherein the first communication device is located at a location:
   receiving, from a second communication device that is remote from the location, a request to monitor the location, wherein the request is received via an intermediate communication device that is distinct from the second communication device and that is communicatively coupled to the second communication device via a wide-area wireless communication network;
   responsive to receiving the request to monitor the location, authenticating the second communication device at least by receiving a location of the second communication device;
   obtaining, using the camera, video data of the location; and
   transmitting, to the second communication device via the intermediate communication device, the video data of the location.

2. The method of claim 1, wherein the intermediate communication device is communicatively coupled to the first communication device via a local-area wireless communication network or a short-range wireless communication network.

3. The method of claim 1, further comprising:
   obtaining, using a microphone of the first communication device, audio data of the location.

4. The method of claim 1, further comprising:
   obtaining, using one or more sensors of the first communication device, at least one of a temperature of the location, a humidity of the location, a pressure of the location, or a motion at the location.

5. The method of claim 1, wherein the intermediate communication device is one of a mobile phone, a laptop computer, a Personal Digital Assistant (PDA), an Internet Protocol (IP)-enabled phone, a video-broadcast system, or a video phone.

6. A first communication device, comprising:
   a receiver configured to receive, from a second communication device that is remote from a location, a request to monitor the location, wherein the first communication device is located at the location, and the request to monitor the location is received via an intermediate communication device that is distinct from the second communication device and that is communicatively coupled to the second communication device via a wide-area communication network;
   a camera configured to capture video data of the location;
   a processor that, in response to the receiver receiving the request to monitor the location, is configured to authenticate the second communication device at least by receiving a location of the second communication device;
   and
   a transmitter configured to transmit, to the second communication device via the intermediate communication device, the video data of the location.

7. The first communication device of claim 6, further comprising:
   a microphone configured to capture audio data of the location,
   wherein the transmitter is configured to transmit the audio data along with the video data to the second communication device via the intermediate communication device.

8. The first communication device of claim 6, wherein the intermediate communication device is configured to receive the video data from the first communication device via a local-area wireless communication network or a short-range wireless communication network, and to transmit the video data to the second communication device via the wide-area communication network.

9. The first communication device of claim 6, wherein the first communication device is one of a Personal Digital Assistant (PDA) or a mobile phone.

10. The first communication device of claim 6, wherein the first communication device is configured to be muted in response to receiving the request to monitor the location from the second communication device.

11. The first communication device of claim 6, further comprising:
one or more sensors configured to capture data related to the location, wherein the data related to the location is associated with infrared movement at the location,
wherein the transmitter is further configured to transmit, to the second communication device via the intermediate communication device, the data related to the location.

12. A first wireless communication device, comprising:
a receiver configured to receive, from a second wireless communication device that is remote from a location, a request to monitor the location, wherein the first wireless communication device is located at the location, wherein the first wireless communication device is communicatively coupled to the second wireless communication device via a wide-area wireless communication network;
a camera configured to capture video data of the location;
a microphone configured to capture audio data of the location;
a processor that, in response to the receiver receiving the request to monitor the location, is configured to authenticate the second wireless communication device a least by receiving a location of the second wireless communication device;
and
a transmitter configured to transmit, to the second wireless communication device, the video data of the location and the audio data of the location.

13. The first wireless communication device of claim 12, further comprising:
one or more sensors configured to capture data related to the location, wherein the one or more additional sensors include one or more of a motion detection sensor, a temperature sensor, a humidity sensor, or a pressure sensor,
wherein the transmitter is further configured to transmit, to the second wireless communication device, the data related to the location.

14. The first wireless communication device of claim 12, wherein the first wireless communication device is configured to receive the request to monitor the location from the second wireless communication device via an intermediate communication device that is communicatively coupled to the second wireless communication device via the wide-area wireless communication network,
wherein the transmitter is configured to transmit the video data and the audio data to the second wireless communication device via the intermediate communication device.

15. The first wireless communication device of claim 14, wherein the intermediate communication device is configured to receive the video data and the audio data from the first wireless communication device via a local-area wireless communication network or a short-range wireless communication network, and to transmit the video data and the audio data to the second wireless communication device via the wide-area wireless communication network.

16. The first wireless communication device of claim 14, wherein the first wireless communication device is one of a Personal Digital Assistant (PDA) or a mobile phone.

* * * * *